(12) United States Patent
Xu (10) Patent No.: US 11,240,786 B2
(45) Date of Patent: Feb. 1, 2022

(54) COMMUNICATION METHOD, NETWORK DEVICE AND TERMINAL

(71) Applicant: GUANGDONG OPPO MOBILE TELECOMMUNICATIONS CORP., LTD., Guangdong (CN)

(72) Inventor: Hua Xu, Ottawa (CA)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/482,978

(22) PCT Filed: Jan. 24, 2018

(86) PCT No.: PCT/CN2018/074036
§ 371 (c)(1),
(2) Date: Aug. 1, 2019

(87) PCT Pub. No.: WO2018/141222
PCT Pub. Date: Aug. 9, 2018

(65) Prior Publication Data
US 2019/0349922 A1    Nov. 14, 2019

Related U.S. Application Data

(60) Provisional application No. 62/453,093, filed on Feb. 1, 2017.

(51) Int. Cl.
*H04W 72/04* (2009.01)
*H04B 17/336* (2015.01)
*H04L 5/00* (2006.01)

(52) U.S. Cl.
CPC ...... *H04W 72/0413* (2013.01); *H04B 17/336* (2015.01); *H04L 5/0092* (2013.01); *H04W 72/0446* (2013.01)

(58) Field of Classification Search
CPC ......... H04W 72/0413; H04W 72/0446; H04W 72/042; H04W 74/0833; H04L 5/0092; H04L 1/004; H04B 17/336
See application file for complete search history.

(56) References Cited

U.S. PATENT DOCUMENTS

10,512,070 B2 * 12/2019 Shao ................. H04L 1/1864
2010/0177694 A1 * 7/2010 Yang ................. H04L 5/0053
370/328

(Continued)

FOREIGN PATENT DOCUMENTS

CN    101442816 A    5/2009
CN    102739374 A    10/2012
(Continued)

OTHER PUBLICATIONS

International Search Report in the international application No. PCT/CN2018/074036, dated Apr. 13, 2018.
(Continued)

*Primary Examiner* — Kibrom T Hailu
(74) *Attorney, Agent, or Firm* — Ladas & Parry LLP (57) ABSTRACT

The present invention provides a communication method, network device and terminal, to improve the flexible in transmitting the PUCCH. A communication method is provided, which comprises: determining, by a network device, one or more first slots to be configured for a terminal to carry a first Physical Uplink Control Channel, PUCCH; and, sending, by the network device, a first piece of information to the terminal, to configure the terminal to carry the first PUCCH in the one or more first slots.

16 Claims, 7 Drawing Sheets

(56) References Cited

U.S. PATENT DOCUMENTS

| | | | | |
|---|---|---|---|---|
| 2012/0250648 | A1* | 10/2012 | Xia | H04L 1/1671 370/329 |
| 2013/0094463 | A1* | 4/2013 | Ebrahimi Tazeh Mahalleh | H04L 5/0037 370/329 |
| 2014/0098780 | A1* | 4/2014 | Kim | H04L 5/0055 370/329 |
| 2015/0131579 | A1 | 5/2015 | Li et al. | |
| 2016/0028512 | A1 | 1/2016 | Papasakellariou | |
| 2016/0192385 | A1 | 6/2016 | Tooher et al. | |
| 2017/0202021 | A1* | 7/2017 | Lee | H04L 25/0226 |
| 2017/0295570 | A1* | 10/2017 | Awad | H04W 72/048 |
| 2018/0084573 | A1* | 3/2018 | Jiang | H04L 5/001 |
| 2018/0132264 | A1* | 5/2018 | Jung | H04L 1/1812 |
| 2018/0167965 | A1* | 6/2018 | Wang | H04L 5/0053 |
| 2018/0279294 | A1* | 9/2018 | Gao | H04L 5/0021 |
| 2018/0279295 | A1* | 9/2018 | Gao | H04W 72/0446 |
| 2019/0261383 | A1* | 8/2019 | Kwak | H04L 1/1607 |
| 2019/0261397 | A1* | 8/2019 | Takeda | H04L 5/0053 |
| 2019/0327726 | A1* | 10/2019 | Zhang | H04B 7/063 |
| 2019/0342877 | A1* | 11/2019 | Matsumura | H04L 25/0226 |
| 2019/0363842 | A1* | 11/2019 | Fu | H04L 1/1671 |
| 2019/0373600 | A1* | 12/2019 | Takeda | H04W 72/0413 |
| 2019/0386795 | A1* | 12/2019 | Matsumura | H04L 5/0012 |
| 2020/0015223 | A1* | 1/2020 | Matsumura | H04L 5/0051 |

FOREIGN PATENT DOCUMENTS

| | | |
|---|---|---|
| EP | 3550918 A1 | 10/2019 |
| RU | 2551899 C2 | 6/2015 |
| WO | 2012087006 A1 | 6/2012 |
| WO | 2018141222 A1 | 8/2018 |

OTHER PUBLICATIONS

Written Opinion of the International Search Authority in international application No. PCT/CN2018/074036, dated Apr. 13, 2018.
First Office Action of the Chinese application No. 201880008198.4, dated Apr. 13, 2020.
Second Office Action of the Chinese application No. 201880008198.4, dated Jun. 29, 2020.
First Office Action of the European application No. 18747490.3, dated Sep. 3, 2020.
First Office Action of the Chilean application No. 201902169, dated Jul. 20, 2020.
First Office Action of the Canadian application No. 3051926, dated Aug. 27, 2020.
Huawei, HiSilicon, Scheduling scheme for slot aggregation, Discussion and decision, 3GPP TSG RAN WG1 NR Ad-Hoc Meeting, R1-1700026, Jan. 16-20, 2017.
LG Electronies, etc., WF on PUCCH resource indication for NR, 3GPP TSG RAN WG1 NR Ad-Hoc, R1-1701523, Jan. 16-20, 2017.
Written Opinion of the Singaporean application No. 11201907004Y, dated Oct. 14, 2020.
Office Action of the Taiwanese application No. 107103649, dated Feb. 26, 2021.
Huawei, Hisilicon, Long Duration UL Control Channel Design, 3GPPTSG RAN WG1 NR Ad Hoc Meeting R1-1700017, Spokane, USA, Jan. 16-20, 2017.
Second Office Action of the European application No. 18747490.3, dated Mar. 11, 2021.
Office Action of the Indian application No. 201917034673, dated Mar. 30, 2021.
First Office Action of the Russian application No. 2019127634, dated Mar. 25, 2021.
Second Office Action of the Canadian application No. 3051926, dated May 3, 2021.
NTT DOCOMO et al : Summary of [87-32]: UL L1/L2 control channel design for NR, 3GPP Draft; RI-1700618, 3rd Generation Partnership Project(3GPP), Mobile Competence Centre; 650, Route Des Lucioles; F-06921 Sophia-Antipolis Cedex; France vol. RAN WGI, No. Spokane, USA Jan. 16-20, Jan. 17, 2017(Jan. 17, 2017), XP051222223,Retrieved from the Internet :URL:http:// www.3gpp.org/ftp/tsg_ran/WG1_RL1/TSGR1-AH/NR-AH 1701/Docs/ [retrieved or Jan. 17, 2017] * Sections 3 .1 and 3 .4.
Intel Corporation:"UL control channel design with long duration ", 3GPP Draft ;R1-1700368 Intel NR PUCCH Long Duration, 3rd Generation Partnership Project (3GPP), Mobi Le Competence Centre 650, Route Des Lucioles; F-06921 Sophi A-Antipolis Cedex; France vol. RAN WGI, No. Spokane, USA; Jan. 16-20, 2017, Jan. 16, 2017 (Jan. 16, 2017), XP051207905 ,Retrieved from the Internet: URL:http://www.3gpp.org/ ftp/Meetings_3GPP_SYNC/RANI/Docs/ [retrieved on Jan. 16, 2017]* Sections 2. 1 and 4.
NTT Docomo et al :"UCI transmission procedure Withand without uplink data ", 3GPP Draft; R1-1700621, 3rd Generation Partnership Project (3GPP), Mobile Competence Centre; 650, Route Des-Lucioles; F-06921 Sophia-Antipolis Cedex; France, vol. RAN WG1, No. Spokane, USA;Jan. 16-20, 2017 Jan. 16, 2017 (Jan. 16, 2017), XP051208146, Retrieved from the Internet: URL:http:// www.3gpp.org/ ftp/Meetings_3GPP_SYNC/RAN1/Docs/ [retrieved on Jan. 16, 2017]* Section 2.2*.
Supplementary European Search Report in European application No. 18747490.3, dated Nov. 26, 2019.
First Office Action of the Israeli application No. 268403, dated Jul. 25, 2021.
Office Action of the Australian application No. 2018214495, dated Nov. 2, 2021.
Third Office Action of the Canadian application No. 3051926, dated Nov. 17, 2021.
LG Electronics, Intel, Panasonic, . . . , WF on tong duration NR-PUCCH [online], 3GPP TSG RAN WG1 adhoc_NR_AH_1701 R1-1701340, Jan. 18, 2017.
Guangdong OPPO Mobile Telecom, On duration aspects of NR PUCCH with long duration [online], 3GPP TSGRAN WG1 #88 R1-1701956, Feb. 7, 2017.
First Office Action of the Japanese application No. 2019-562453, dated Dec. 7, 2021.

* cited by examiner

COMMUNICATION METHOD, NETWORK DEVICE AND TERMINAL

RELATED APPLICATION

This application is an application under 35 U.S.C. 371 of International Application No. PCT/CN2018/074036 filed on Jan. 24, 2018, which claims the benefit of U.S. Provisional Appln. No. 62/453,093 filed on Feb. 1, 2017, the entire contents of each of which are incorporated herein by reference.

TECHNICAL FIELD

The present invention relates to communication technologies, and particularly to a communication method, network device and terminal.

BACKGROUND

In a Long Term Evolution (LTE) system where a Physical Uplink Control Channel (PUCCH) is transmitted in a full uplink subframe with fixed number of symbols (e.g., 14 symbols) at the edges of system bandwidth.

However, the method of transmitting the PUCCH is not flexible.

SUMMARY

The present invention provides a communication method, network device and terminal, to improve the flexible in transmitting the PUCCH.

At the first aspect, a communication method is provided, which includes:

determining, by a network device, one or more first slots to be configured for a terminal to carry a first Physical Uplink Control Channel, PUCCH; and, sending, by the network device, a first piece of information to the terminal, to configure the terminal to carry the first PUCCH in the one or more first slots.

At the second aspect, a communication method is provided, which includes:

receiving, by a terminal, a first piece of information from a network device, the first piece information is used to configure the terminal to carry a first Physical Uplink Control Channel, PUCCH in one or more first slots; and carrying, by the terminal, the first PUCCH in the one or more first slots, according to the first piece of information.

At the third aspect, a network device is provided, which includes:

a processing unit, configured to determine one or more first slots to be configured for a terminal to carry a first Physical Uplink Control Channel, PUCCH; and, a communication unit, configured to send a first piece of information to the terminal, to configure the terminal to carry the first PUCCH in the one or more first slots.

At the fourth aspect, a terminal is provided, which includes:

a communication unit, configured to receive a first piece of information from a network device, the first piece information is used to configure the terminal to carry a first Physical Uplink Control Channel, PUCCH in one or more first slots; and the processing unit configured to carry the first PUCCH in the one or more first slots, according to the first piece of information.

Accordingly, in the embodiments of the present invention, the network device sends a first piece of information to the terminal to configure the terminal to carry the first PUCCH in the one or more first slots, and the terminal carries the first PUCCH according to the first piece of information. Thus, the terminal needs not to transmit the PUCCH in a full uplink subframe with fixed number of symbols, thus improving the flexible in transmitting the PUCCH.

BRIEF DESCRIPTION OF DRAWINGS

To describe the technical solutions in the embodiments of the present invention more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as, a Global System for Mobile Communications (GSM), a Code Division Multiple Access (CDMA) system, a Wideband Code Division Multiple Access (WCDMA), a general packet radio service (GPRS), and a Long Term Evolution (LTE), a New Radio (NR, or called 5G or 5G NR).

A terminal also referred to as a user equipment (UE), a mobile terminal, a mobile user equipment, and the like, may communicate with one or more core networks through a radio access network (for example, RAN). The user equipment may be a mobile terminal, such as a mobile phone (also referred to as a "cellular" phone) and a computer with a mobile terminal. For example, the user equipment may be a portable, pocket-sized, handheld, computer built-in, or vehicle-mounted mobile apparatus, which exchanges language and/or data with the radio access network.

A network device may be a base transceiver station (BTS, Base Transceiver Station) in GSM or CDMA, or may be a NodeB (Node B) in WCDMA, or may be an evolved NodeB (eNB or e-NodeB, evolutional Node B) in LTE, or a base station in NR, which is not limited in the present invention.

Figure 1:
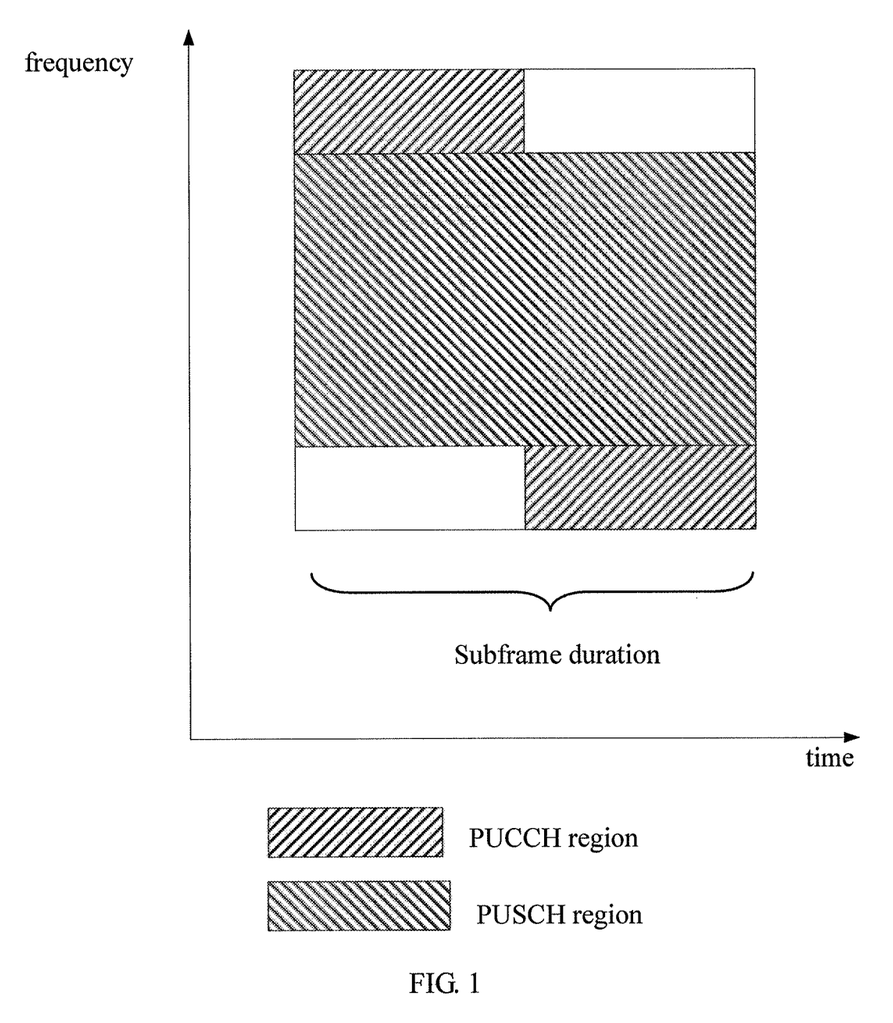
FIG. 1 illustrates PUCCH transmission in 4G LTE.

In a Long Term Evolution (LTE) system where a Physical Uplink Control Channel (PUCCH) is transmitted in a full uplink subframe with fixed number of symbols (e.g., 14 symbols) at the edges of system bandwidth, as shown in FIG. 1 as example.

However, the method of transmitting the PUCCH is not flexible.

The present invention provides a method, network device and terminal, to improve the flexible transmitting the PUCCH.

Figure 2:
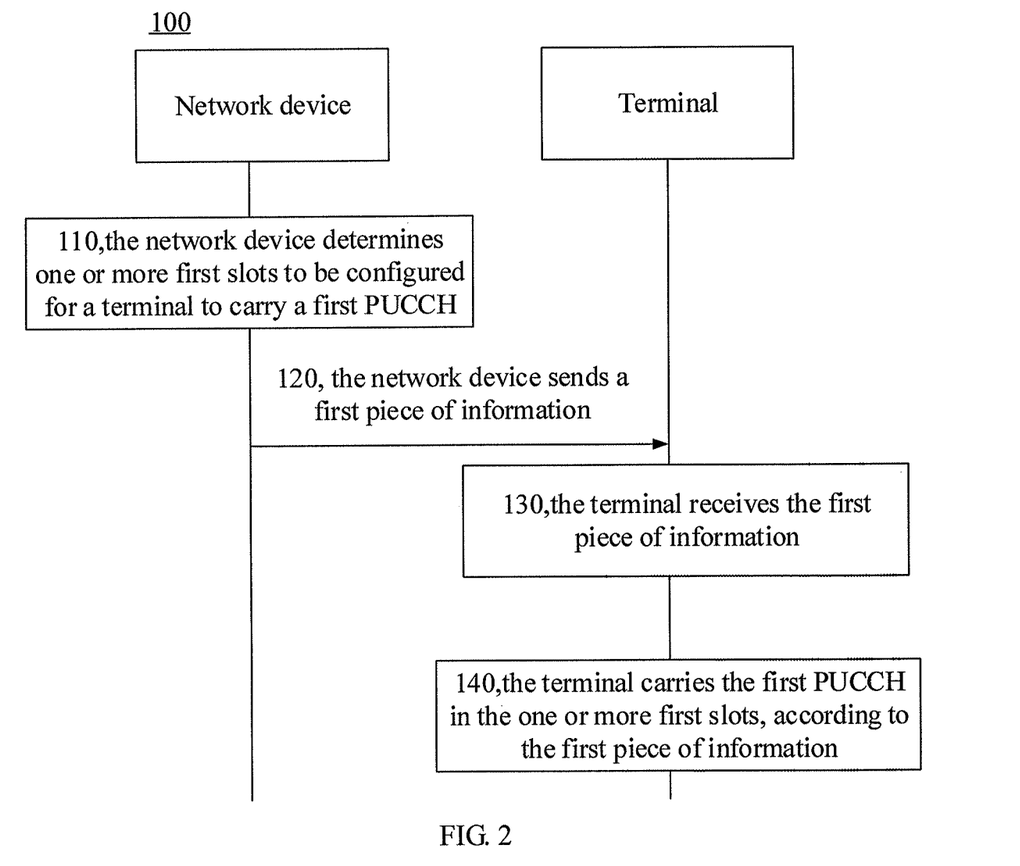
FIG. 2 illustrates a communication method according to an embodiment of the present invention.

FIG. 2 is a communication method 100 according to an embodiment of the present invention.

At 110, a network device determines one or more first slots to be configured for a terminal to carry a first PUCCH.

Alternatively, the network device estimates a number of symbols to be configured for the terminal to carry the first PUCCH, and determines the one or more first slots, according to the estimated number of symbols and the structure of slots capable of being used by the terminal.

Alternatively, the structure of the available slots shows the number of uplink symbols and/or downlink symbols.

Also, the structure of the available slots may show the positions of the uplink symbols and/or the downlink symbols.

Figure 3:
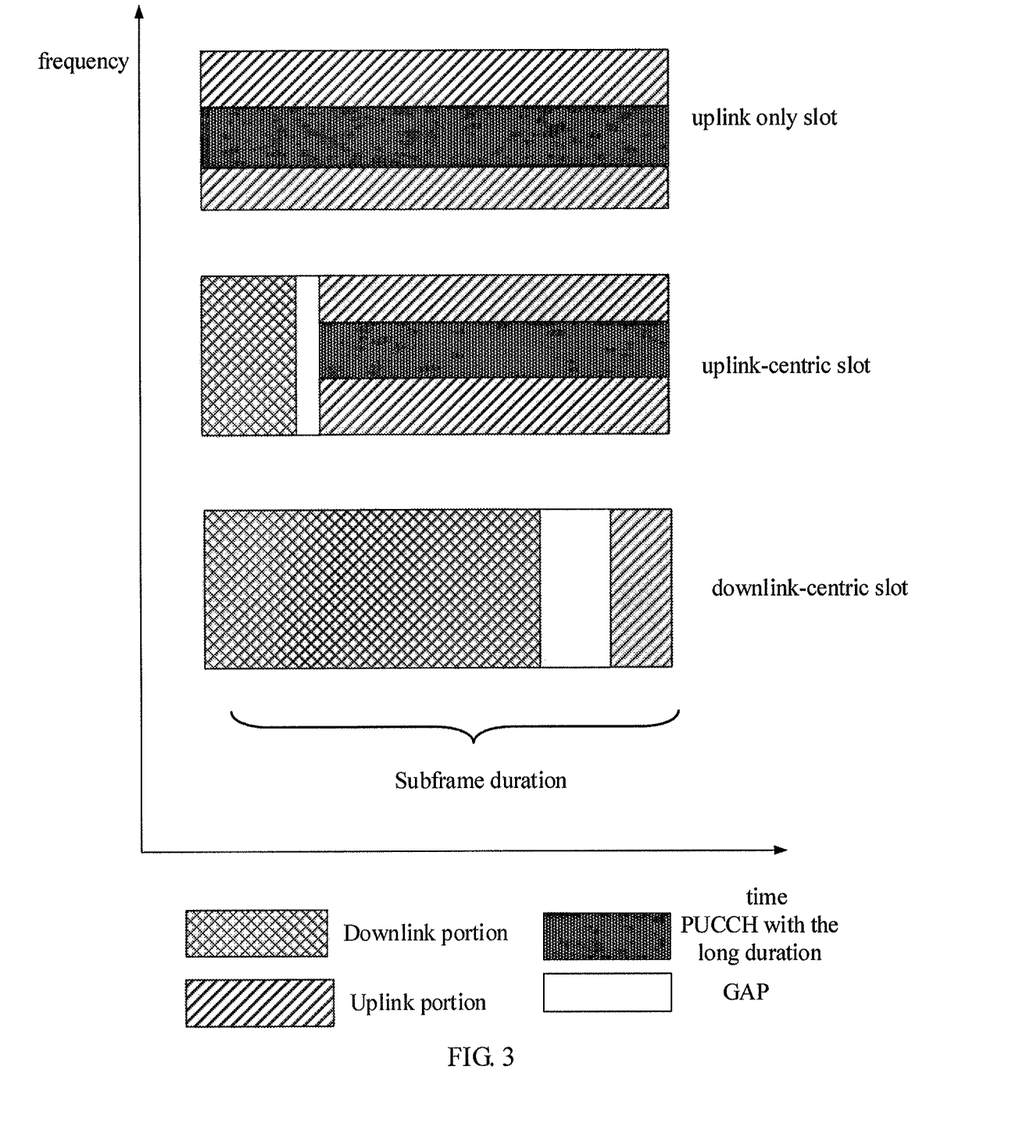
FIG. 3 illustrates an example of the slot structure in NR.

FIG. 3 shows some examples of different slot structures that may be used in NR, which include full uplink slots (all symbols are used for uplink transmission), slots with both UL/DL transmissions.

For slots with both UL/DL transmissions, some slots are uplink-centric where there are more uplink symbols, while some slots are downlink-centric where there are more downlink symbols.

There is a guard period (GP) between DL/UL transmission to allow the terminal to switch from DL reception to UL transmission.

Figure 4:
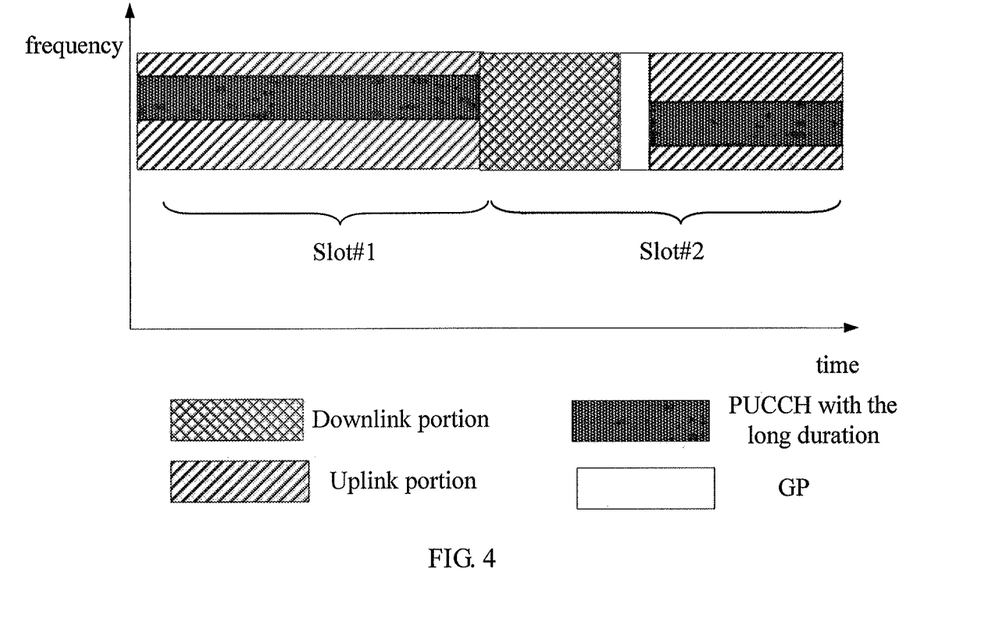
FIG. 4 illustrates an example of slot aggregation to form the PUCCH with the long duration.

FIG. 4 shows an example of two slots aggregated to form the first PUCCH (PUCCH with a long duration mentioned above), where slot #1 is a full uplink slot, while slot #2 is an uplink-centric slot.

It shall be mentioned that such slot aggregation for the PUCCH is per terminal configuration.

For example, for some terminal, maybe 2 slot aggregation is needed for its PUCCH while for other terminals, single slot is enough.

Alternatively, the network device may estimate the number of symbols to be configured for the terminal to carry the first PUCCH, according to at least one of:

SINR of an uplink channel between the terminal and the network device, a size of a cell on which the terminal is camped, signal loss of a path between the terminal and the network device, geometry of the terminal and uplink transmission power of the terminal.

Alternatively, the first PUCCH may be referred as a PUCCH with a long duration.

To guarantee the performance of the first PUCCH with the long duration for the cell edge terminal, there is a necessity to maintain certain number of symbols that is used for a PUCCH. For example, the PUCCH with the long duration could have total 14 symbols (including symbols carrying DMRS) similar to that in 4G LTE, hence, at least maintain the similar performance as in 4G LTE. Certainly with different locations of the terminals in the cell and/or different cell sizes, the number of symbols that is needed could vary. On the other side, with the existence of various slot types with different available uplink symbols, sometimes it needs to aggregate consecutive slots together to meet the requirement of total uplink symbols for a PUCCH. Such aggregation needs to be informed to the terminal so that the terminal could prepare UCI and transmitted on those designated slot and symbols for its PUCCH.

Alternatively, the PUCCH with the long duration could start/end in any symbol in a slot.

At 120, the network device sends a first piece of information to the terminal.

Alternatively, the network device may send the first piece of information to the terminal semi-statically.

Alternatively, the first piece of information may be signaled to the terminal dynamically or semis-statically on a per terminal basis.

For example, Downlink Control Information (DCI) for scheduling a corresponding PDSCH could be used to carry the first piece of information.

In general, 1 or 2 bits could be used to signal the number of aggregated slots (up to 4 aggregated slots for example).

At 130, the terminal receives the first piece of information from the network device.

At 140, the terminal carries the first PUCCH in the one or more first slots, according to the first piece of information.

Alternatively, the first piece of information carries an index of each first slot.

Accordingly, after receiving the first piece of information, the terminal may know the first slots configured for the first PUCCH according to the index of the each first slot.

Or, the first piece of information carries an indication (e.g., index) of a starting first slot, and a number of the first slots. After receiving the first piece of information, the terminal may know the first slots configured for the first PUCCH according to the indication of the starting first slot, and the number of the first slots.

If all the slots after the starting slot may be used to carry the PUCCH, the slots configured for the first PUCCH may include multiple consecutive slots.

If only the full uplink slot and uplink-centric slot may be used to carry the first PUCCH, the slots configured for the first PUCCH may include multiple nonconsecutive slots, because downlink-centric slots may need to be skipped in the slots aggregation.

Alternatively, all of the uplink symbols of the first slot are configured for the PUCCH. The first piece of information may not indicate symbols configured for the terminal to carry the first PUCCH, of the first slot.

The network device may send a second piece of information indicating the structure of the first slot, for example via a common channel. The terminal may know the structure of the first slot from the second piece of information. Thus, the terminal may determine the uplink symbols of the first slot according to the structure of the first slot.

As different slots may have different structures, a number of available symbols that could be used for PUCCH could be different. To simplify the design, it is proposed to use all the uplink symbols in a designated slot for the PUCCH. In the situation of slot aggregation, even if the total number of available uplink symbols in aggregated slots may surpass the total number of symbols that is required, all symbols in the last slot could still be assigned for PUCCH. This could avoid the efforts to reuse leftover symbols in that slot. As shown in FIG. 4, all the symbols in both slot #1 and slot #2 are used for the PUCCH, even though total symbols may be larger than what is really needed.

Figure 5:
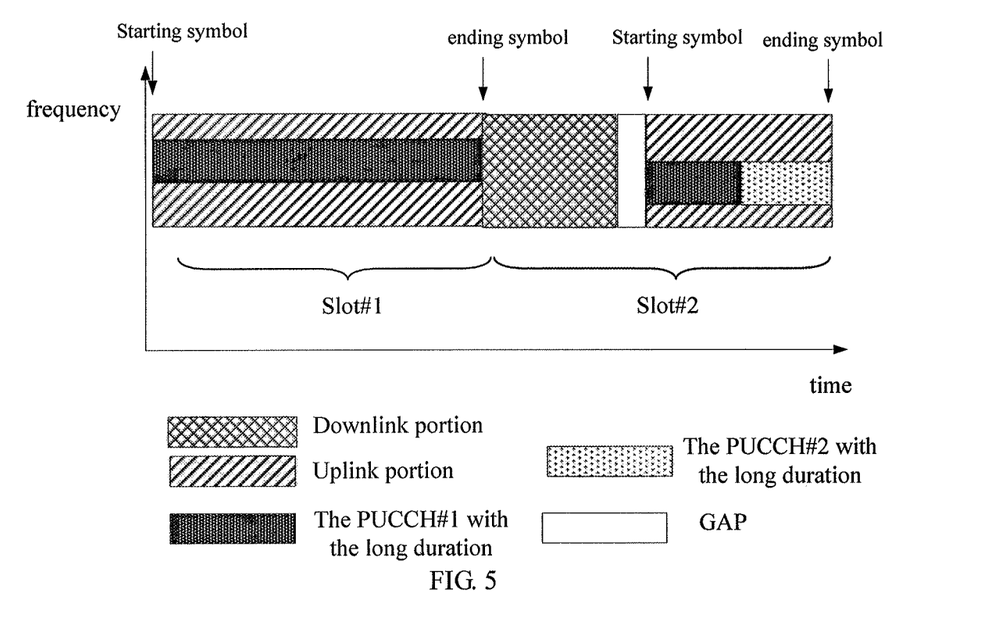
FIG. 5 illustrates an example of the PUCCH with the long duration ending in the middle of a slot.

As different slots may have different structures, the terminal needs to know starting/ending symbols or number of symbols that are used in each slot for the first PUCCH. If all the uplink symbols in a designated slot are used for the first PUCCH, the starting symbol is simply the starting symbol for uplink and the ending symbol is the last uplink symbol in the slot. Such information may not need to be signaled on per terminal basis as the terminal could derive them from other signals. For example, the starting/ending symbol could be derived from the slot structure that may be conveyed from some common control channel, such as group/cell common control channel or SIB (system information block). As shown in FIG. 5, the starting symbol and ending symbol of each slot could be derived by the terminal from some common control channel as part of the information of slot structure.

Alternatively, the first piece of information further indicates symbols, configured for the terminal to carry the first PUCCH, of the first slot. In this case, the terminal may know the symbols configured for the terminal to the carry the first PUCCH based on the first piece of information.

Alternatively, the first piece of information indicates at least one of:

a starting symbol of each first slot configured for the terminal to carry the first PUCCH, an ending symbol of each first slot configured for the terminal to carry the first PUCCH, and a number of symbols of each first slot configured for the terminal to carry the first PUCCH.

For example, the first piece of information indicates the starting symbol of the first slot. The terminal may know that all uplink symbols of the slot after the starting symbol and the starting symbol are configured for the first PUCCH.

For example, the first piece of information indicates the ending symbol of the first slot. The terminal may know that all uplink symbols of the slot before the ending symbol and the ending symbol are configured for the first PUCCH.

For example, the first piece of information indicates the ending symbol and the ending symbol of the first slot. The terminal may know that all uplink symbols between the starting symbol and the ending symbol, the starting symbol and the ending symbol are configured for the first PUCCH.

Alternatively, the ending symbol of the first PUCCH could be in the middle of the slot, and remaining symbols of the slot could be used by another terminal for its PUCCH, as shown in FIG. 5 as an example.

This approach may have some benefits, when most of slots are uplink-only slots, to support PUCCH starting/ending at any symbol in the slot, improve the multiplexing capability and save more overhead.

Alternatively, the PUCCH with the long duration for different terminals may be multiplexed or partially multiplexed on the same time-frequency resource(s).

Figure 6:
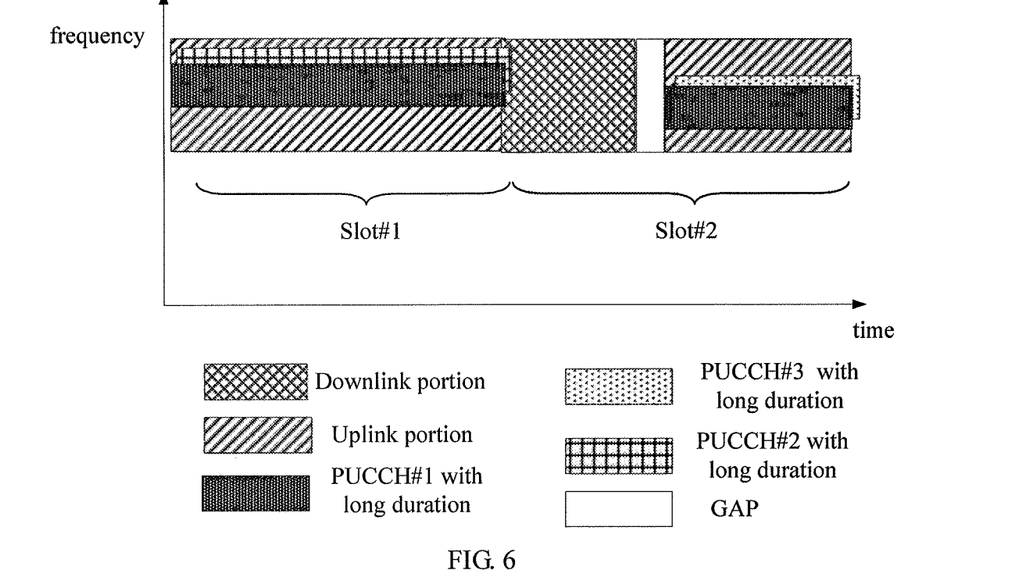
FIG. 6 illustrates multiplexing of the PUCCHs with the long durations.

As shown in FIG. 6, PUCCH #1 spans two slots while PUCCH #2 and #3 span one slot respectively. PUCCH #2 and PUCCH #3 could be multiplexed with PUCCH #1 in different slots respectively. That would make the allocation and multiplexing of PUCCH of different UE more flexible and save time-frequency resource overhead for PUCCH transmission Alternatively, the network device determines one or more second slots to be configured for the terminal to carry a second PUCCH; and sends a third piece of information to the terminal, to configure the terminal to carry the second PUCCH in the one or more second slots. In this case, the terminal receives the third piece of information from the network device, and carries the second PUCCH in the one or more second slots.

Alternatively, the first PUCCH is configured to carry a UCI of a first application, and the second PUCCH is configured to carry a UCI of a second application different from the first application.

For example, the first PUCCH is configured to carry Acknowledge (ACK) or Non-Acknowledge (NACK) information of a PDSCH, and the second PUCCH is configured to carry ACK or NACK information of another PDSCH.

For example, the first PUCCH is configured to send a schedule request, and the second PUCCH is configured to carry ACK or NACK information of another PDSCH.

For example, the first PUCCH is configured to send CQI feedback, and the second PUCCH is configured to carry a schedule request.

In NR system design, the physical uplink control channel (PUCCH) with the long duration (or format) is introduced. The main purpose of PUCCH with the long duration is to transmit uplink control information (UCI) for the cell edge terminal or wherever terminal has a coverage issue. To maintain robustness performance of PUCCH for the cell edge terminal, the UCI transmitted on PUCCH could be spread/repeated and transmitted on same/different symbols within the time-frequency resources assigned for PUCCH and frequency hopping could be utilized for frequency diversity gain.

Alternatively, there is at least one symbol configured for both the first PUCCH and the second PUCCH.

Alternatively, there is no symbol configured for both the first PUCCH and the second PUCCH.

Alternatively, the first PUCCH may be the PUCCH with the long duration and the second PUCCH may be a PUCCH with a short duration.

Alternatively, the first PUCCH configured is a shortened PUCCH with the long duration where all of the uplink symbols of the one slot except symbols configured to carry the second PUCCH are configured to carry the first PUCCH.

Alternatively, the first PUCCH configured by the first piece of information is a shortened PUCCH with the long duration where all symbols of the one slot except last one or two symbols are configured to carry the first PUCCH, and the second PUCCH configured is the PUCCH with the short duration where last one or two symbols of the one slot are configured to carry the second PUCCH.

In this case, the first piece of information and the second piece of information may be signaled to the terminal semi-statically.

Alternatively, the second PUCCH is the PUCCH with the short duration which occupies the last one or two symbols of the slot, and the first PUCCH configured is a normal PUCCH with the long duration where all symbols of the one slot are configured to carry the second PUCCH.

In this case, the first piece of information and the second piece of information may be signaled to the terminal semi-statically.

And the network device may dynamically send a fourth piece of information indicating the ending symbol of the first PUCCH to be transmitted in the one slot.

Alternatively, shortened or normal PUCCH format could be signaled, through the fourth piece of information to the terminal to indicate the ending symbol of PUCCH with long duration in that slot.

Alternatively, before sending the fourth piece of information, the network device may determine the ending symbol of the first PUCCH to be transmitted on the one slot, according to whether a time-frequency resource configured for the first PUCCH in the last one-two symbols of the slot is overlapped with a time-frequency resource configured for the second PUCCH in the last one-two symbols of the slot.

If the time-frequency resource configured for the first PUCCH in the last one-two symbols of the slot is not overlapped with a time-frequency resource configured for the second PUCCH in the last one-two symbols of the slot, the ending symbol indicated by the fourth information may be the last one symbol of the slot.

If the time-frequency resource configured for the first PUCCH in the last one-two symbols of the slot is overlapped with a time-frequency resource configured for the second PUCCH in the last one or two symbols of the slot, the ending symbol indicated by the fourth information may be the last second or the last third symbol of the slot. In this situation, the first PUCCH to be transmitted may be the shortened PUCCH with the long duration.

Figure 7:
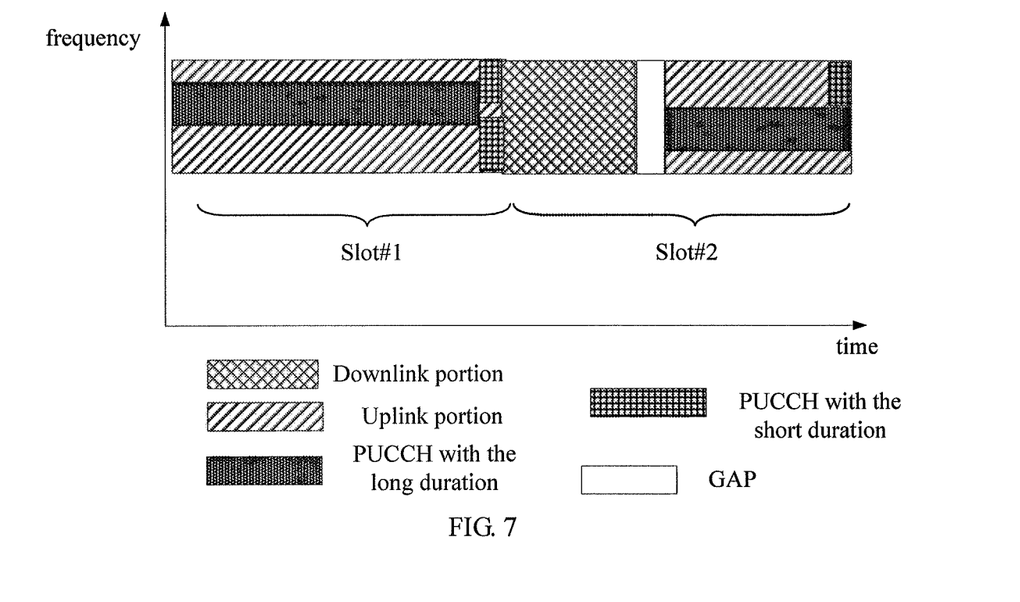
FIG. 7 illustrates an example of overlapping between the PUCCH with the long duration and the PUCCH with the short duration.

Specifically, in NR, in order to provide quick UCI feedback, a PUCCH with a short duration (or format) is introduced which may be transmitted in the last couple of symbols in a slot as shown in FIG. 7. As there exist different UCIs for the same terminal for different applications, which need to be transmitted on these two type of PUCCH respectively, there is a need to support the co-existence of PUCCH with long and short durations in the same slot(s). That will lead to the situation that the PUCCH with the long duration having overlap with the PUCCH with the short duration. The simple way to handle such situation is to shorten the duration of PUCCH with the long duration to avoid the overlapping, as shown by PUCCH in slot #1 of FIG. 7 as an example. In this case, the ending symbol of the PUCCH with the long duration in that slot needs to be signaled to the terminal in a dynamic or semis-static way, or the terminal could derive it from the PUCCH configuration for a short duration. Sometimes, there may not exist any transmission of the PUCCH with the short duration on the physical resource blocks (PRBs) assigned to the PUCCH with the long duration on those overlapping symbols, hence to utilize those overlapping resources, the duration of PUCCH with the long duration could be extended to the end of the slot as shown by PUCCH in slot #2 in FIG. 7. In such case, the terminal also needs to be informed with the ending symbol for the PUCCH with the long duration and such signaling could be dynamically sent, for example in DCI for corresponding PDSCH. Alternatively, the PUCCH with the long duration could be categorized into two formats, the first one is the slot with a shortened duration as shown by PUCCH in slot #1 of FIG. 7 where there is no overlapping with the PUCCH of the short duration, and the second one is the slot with a normal duration where PUCCH with the long duration shall end at the last one or two symbols of the slot as shown by PUCCH in slot #2 of FIG. 7. In this case, there may be overlapping between PUCCH with long and short durations. The terminal could be signaled which format to use dynamically using e.g., DCI for the corresponding PDSCH.

Figure 8:
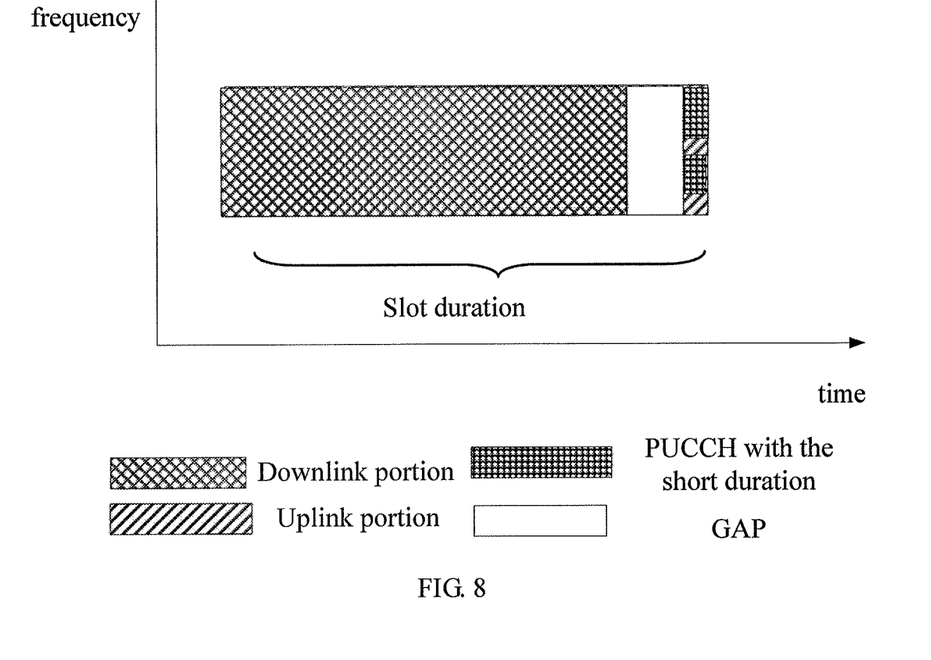
FIG. 8 illustrates an example of downlink-centric slot.

Sometimes, the slot is a downlink-centric and uplink slot which may only contains 1 to 2 symbols, which can be configured for the PUCCH with the short duration, as shown in FIG. 8.

In this situation, it is felt that the PUCCH with the long duration shall not be transmitted on such a lot due to the facts that first there are not many uplink symbols available for the PUCCH with the long duration, second it will bring increased complexity of multiplexing PUCCH with long and short durations. In a word, for downlink-centric slot, the network device shall not assign resources for the PUCCH with the long duration and the terminal shall not assume the transmission of the PUCCH with the long duration in such type of slots. If slots are aggregated for the PUCCH with the long duration, such slots may need to be skipped in the aggregation.

It should be understood that the PUCCH with the short duration may occupy the last three or four symbols (or last symbols with other number) of the slot, and the shortened PUCCH with the long duration may occupy all uplink symbols except for the last three or four symbols (or last symbols with other number) of the slot.

Figure 9:
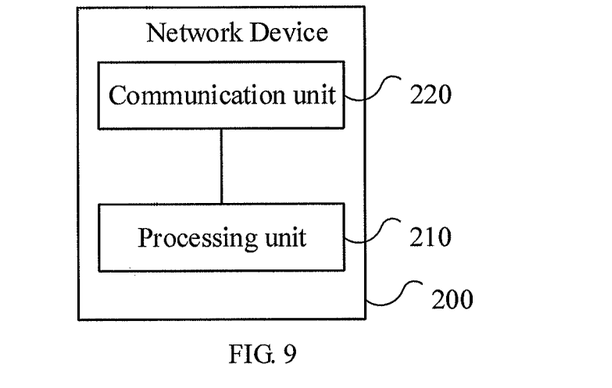
FIG. 9 illustrates is a schematic block diagram of a network device according to an embodiment of the present invention.

FIG. 9 is a schematic block diagram of a network device 200 according to an embodiment of the present invention.

As shown in FIG. 9, the network device 200 includes: a processing unit 210, configured to determine one or more first slots to be configured for a terminal to carry a first Physical Uplink Control Channel, PUCCH; and, a communication unit 220, configured to send a first piece of information to the terminal, to configure the terminal to carry the first PUCCH in the one or more first slots.

Alternatively, the processing unit 210 is further configured to:

estimate a number of symbols to be configured for the terminal to carry the first PUCCH; and, determine the one or more first slots, according to the estimated number of symbols and the structure of slots capable of being used by the terminal.

Alternatively, the structure of the slots shows the number of uplink symbols and/or downlink symbols.

Alternatively, the processing unit 210 is further configured to:

estimate the number of symbols to be configured for the terminal to carry the first PUCCH, according to at least one of:

SINR of an uplink channel between the terminal and the network device, a size of a cell on which the terminal is camped, signal loss of a path between the terminal and the network device, geometry of the terminal and uplink transmission power of the terminal.

Alternatively, the first piece of information carries an index of each first slot, or, the first piece of information carries an indication of a starting first slot, and a number of the first slots.

Alternatively, all of the uplink symbols of the first slot are configured to carry the first PUCCH.

Alternatively, the communication unit 220 is further configured to:

send a second piece of information indicating the structure of the first slot via a common control channel.

Alternatively, the first piece of information further indicates symbols, configured for the terminal to carry the first PUCCH, of the first slot.

Alternatively, the first piece of information indicates at least one of:

a starting symbol configured for the terminal to carry the first PUCCH, an ending symbol configured for the terminal to carry the first PUCCH, and a number of symbols configured for the terminal to carry the first PUCCH.

Alternatively, the first piece of information is dynamically or semi-statically sent to the terminal.

Alternatively, the processing unit 210 is further configured to determine one or more second slots to be configured for the terminal to carry a second PUCCH; and the communication unit is further configured to send a third piece of information to the terminal, to configure the terminal to carry the second PUCCH in the one or more second slots.

Alternatively, the first PUCCH is configured to carry a UCI of a first application, and the second PUCCH is configured to carry a UCI of a second application different from the first application.

Alternatively, the first PUCCH configured is a PUCCH with a long duration, and the second PUCCH configured is a PUCCH with a short duration.

Alternatively, one second slot is configured to carry one second PUCCH, and the one second slot is one slot of the one or more first slots configured to carry one first PUCCH.

Alternatively, the first PUCCH configured is a shortened PUCCH with the long duration where all of the uplink symbols of the one slot except symbols configured to carry the second PUCCH are configured to carry the first PUCCH.

Alternatively, the first PUCCH configured is a shortened PUCCH with the long duration where all of the uplink symbols of the one slot except last one or two symbol are configured to carry the first PUCCH, and the second PUCCH is a PUCCH with the short duration where the last one or two symbols of the one slot are configured to carry the second PUCCH. Alternatively, the first PUCCH configured is a normal PUCCH with the long duration where all of the uplink symbols of the one slot are configured to carry the first PUCCH, and the second PUCCH is a PUCCH with short the duration where the last one or two symbols of the one slot are configured to carry the second PUCCH.

Alternatively, the communication unit 220 is further configured to:

send a fourth piece of information indicating an ending symbol of the first PUCCH to be transmitted in the one slot.

Alternatively, the processing unit 210 is further configured to:

determine the ending symbol of the first PUCCH to be transmitted on the one slot, according to whether a time-frequency resource configured for the first PUCCH in the last one-two symbols is overlapped with a time-frequency resource configured for the second PUCCH in the last one-two symbols.

Alternatively, if the time-frequency resource configured for the first PUCCH in the last one-two symbols is not overlapped with a time-frequency resource configured for the second PUCCH in the last one-two symbols of the slot, the ending symbol indicated by the fourth information is the last one symbol of the slot; and if the time-frequency resource configured for the first PUCCH in the last one-two symbols of the slot is overlapped with a time-frequency resource configured for the second PUCCH in the last one or two symbols of the slot, the ending symbol indicated by the fourth information is the last second or the last third symbol of the slot.

Alternatively, the first slot is an uplink-centric slot.

It should be understood that the network device 200 is corresponding to the network device in the method embodiments, and implements the operation implemented by the network device in the method embodiments.

Figure 10:
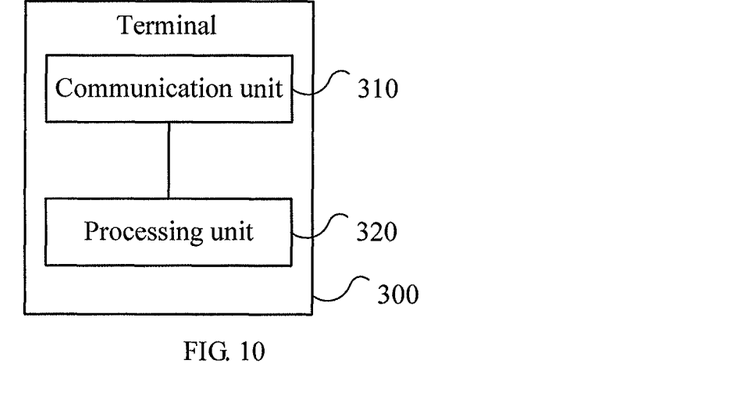
FIG. 10 illustrates is a schematic block diagram of a terminal according to an embodiment of the present invention.

FIG. 10 is a schematic block diagram of a terminal 300 according to an embodiment of the present invention.

As shown in FIG. 10, the terminal 300 includes: a communication unit 310, configured to receive a first piece of information from a network device, the first piece information is used to configure the terminal to carry the first Physical Uplink Control Channel, PUCCH in the one or more first slots; and the processing unit 320 configured to carry the first PUCCH in the one or more first slots, according to the first piece of information.

Alternatively, the first piece of information carries an index of each first slot, or, the first piece of information carries an indication of a starting first slot, and a number of the first slots.

Alternatively, all of the uplink symbols of the first slot are configured to carry the first PUCCH.

Alternatively, the processing unit 320 is further configured to:

determine the uplink symbols of the first slot based on the structure of the first slot, wherein the structure of the first slot shows a number of uplink symbols and/or downlink symbols.

Alternatively, the communication unit 310 is further configured to:

receive a second piece of information indicating the structure of the first slot from the network device, wherein the second piece of information is carried in a common control channel.

Alternatively, the first piece of information further indicates symbols, configured for the terminal to carry the first PUCCH, of the first slot.

Alternatively, the first piece of information indicates at least one of:

a starting symbol configured for the terminal to carry the first PUCCH, an ending symbol configured for the terminal to carry the first PUCCH, and a number of symbols configured for the terminal to carry the first PUCCH.

Alternatively, the first piece of information is dynamically or semi-statically sent to the terminal.

Alternatively, the communication unit 310 is further configured to:

receive a second piece of information from the network device, the second piece information is used to configure the terminal to carry the second PUCCH in the one or more second slots; and the processing unit 320 is configured to:

carry the second PUCCH in the one or more second slots.

Alternatively, the first PUCCH is configured to carry a UCI of a first application, and the second PUCCH is configured to carry a UCI of a second application different from the first application.

Alternatively, the first PUCCH configured is a PUCCH with a long duration, and the second PUCCH configured is a PUCCH with a short duration.

Alternatively, one second slot is configured to carry one second PUCCH, and the one second slot is one slot of the one or more first slots configured to carry one first PUCCH.

Alternatively, the first PUCCH configured is a shortened PUCCH with the long duration where all of the uplink symbols of the one slot except last one or two symbol are configured to carry the first PUCCH, and the second PUCCH is a PUCCH with the short duration where the last one or two symbols of the one slot are configured to carry the second PUCCH.

Alternatively, the first PUCCH configured is a normal PUCCH with the long duration where all of the uplink symbols of the one slot are configured to carry the first PUCCH, and the second PUCCH is a PUCCH with the short duration which occupies the last one or two symbols of the one slot.

Alternatively, the communication unit 310 is further configured to:

receive a fourth piece of information from the network device, wherein the fourth piece information indicates an ending symbol of the first PUCCH to be transmitted on the one slot; and the processing unit is further configured to carry the first PUCCH in the one or more first slots according to the fourth information.

Alternatively, the first slot is an uplink-centric slot.

It should be understood that the terminal 300 is corresponding to the terminal in the method embodiments, and implements the operation implemented by the terminal in the method embodiments.

Figure 11:
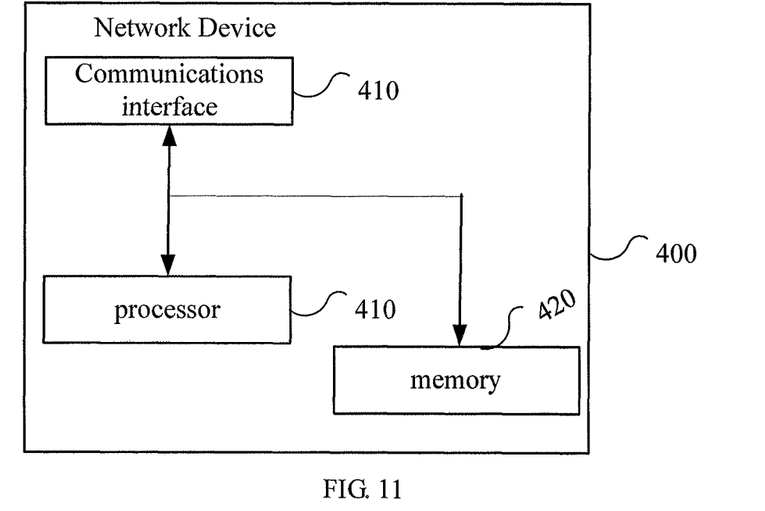
FIG. 11 illustrates is a schematic block diagram of a communication device according to an embodiment of the present invention.

FIG. 11 is a schematic block diagram of a communication device 400 according to an embodiment of the present invention.

The device 400 may operate the methods described above. The device 400 may operate according to one or more communications or data standards or technologies including but not limited to NR.

The device 400 may be generally any device capable of providing wireless communication such as a terminal or a network device.

The device 400 may include a processor 410, a memory 420 and a communications interface 430 for sending and/or receiving data over a communication network, which components may or may not be arranged as shown in FIG. 4. The device 400 may include a user interface (not shown) for receiving information and commands from a user of the device and providing or displaying information to user. In some embodiments, the device 400 includes a machine which performs other primary and has the capability to send data to a communication network.

Through the communications interface 430, the device may transmit, receive, or transmit and receive signals through a wireless medium to and from another device in a communication network. The communications interface 430 may include one or more antennas (not shown), transmitters, receivers and decoders (not shown). Received signals are input to the communications interface 430, which may perform such common receiver functions as signal amplification, frequency down conversion, filtering, channel selection, analog-to-digital conversion. In a similar manner, signals to be transmitted are processed by the communications interface 430, including modulation and encoding, digital-to-analog conversion, frequency up conversion, filtering, amplification and transmission.

The memory 420 may store instructions, and the processor 410 may perform any the method by performing the instructions stored in the memory 410.

According, in the embodiments of the present invention, the network device sends a first piece of information to the terminal to configure the terminal to carry the first PUCCH in the one or more first slots, and the terminal carries the first PUCCH according to the first piece of information. Thus, the terminal needs not to transmit the PUCCH in a full uplink subframe with fixed number of symbols, thus improving the flexible in transmitting the PUCCH.

Those of ordinary skill in the art can realize that the units and algorithmic steps of the examples described in conjunction with the embodiments disclosed herein may be realized by electronic hardware or the combination of computer software and electronic hardware. Whether these functions are executed in a hardware or software mode depends on the specific applications and design constraint conditions of the technical solution. For each specific application, professionals may realize the described functions by different methods, but this realization shall not be considered as being beyond the scope of the present invention.

Those skilled in the art to which the present invention pertains may clearly understand that, for the purpose of better convenience and briefness in description, for the specific working processes of the above-described systems, devices and units, reference could be made to the corresponding processes in the embodiments of the aforementioned methods, and repeated description is not given here.

In the several embodiments provided in the application, it shall be understood that the disclosed systems, devices and methods may be realized in other modes. For example, the embodiments of the above-described devices are only exemplary, for example, the division of the units is only a logic function division, other division modes may be adopted in practice, e.g., multiple units or components may be combined or integrated in another system, or some characteristics may be omitted or be not executed. From another point of view, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on multiple network units. The objective of the solution of the embodiments may be fulfilled by selecting part of or all of the units according to actual needs.

In addition, in various embodiments of the present invention, the functional units may be integrated in one processing unit, or the functional units may separately and physically exist, or two or more units may be integrated in one unit.

When the functions are realized in the form of software functional units and sold or used as independent products, the functions may be stored in a computer-readable storage medium. Based on such an understanding, the technical solution of the present invention substantially, or the part of the present invention making contribution to the prior art, or a part of the technical solution may be embodied in the form of a software product, and the computer software product is stored in a storage medium, which includes a plurality of instructions enabling computer equipment (which may be a personal computer, a server, network equipment or the like) to execute all of or part of the steps in the methods of the embodiments of the present invention. The aforementioned storage medium includes: various media capable of storing program codes, such as USB disk, mobile hard disk, read-only memory (ROM, read-only memory), random access memory (RAM, random access memory), disk, optical disk or the like.

Described above are the specific embodiments of the present invention only, but the protection scope of the present invention is not limited to this, those skilled who are familiar with the art could readily think of variations or substitutions within the technical scope disclosed by the present invention, and these variations or substitutions shall fall within the protection scope of the present invention. Thus, the protection scope of the present invention should be defined by the claims.

The invention claimed is:

1. A communication method, comprising:
   determining, by a network device, one or more first slots to be configured for a terminal to carry a first Physical Uplink Control Channel (PUCCH); and
   sending, by the network device, a first piece of information to the terminal, to configure the terminal to carry the first PUCCH in the one or more first slots, wherein the first piece of information carries an indication of a starting first slot of the one or more first slots, and a number of the one or more first slots, and wherein when not all the first slots after the starting first slot are used to carry the first PUCCH, the first slots configured for carrying the first PUCCH include multiple nonconsecutive slots.

2. The method of claim 1, wherein the determining, by the network device, the one or more first slots to be configured for a terminal to carry a first PUCCH comprises:

estimating, by the network device, a number of symbols to be configured for the terminal to carry the first PUCCH; and determining, by the network device, the one or more first slots according to the estimated number of symbols and the structure of slots capable of being used by the terminal, wherein the structure of the slots shows the number of uplink symbols and/or downlink symbols.

3. The method of claim 1, the method further comprising:

sending, by the network device, a second piece of information indicating the structure of the one or more first slots via a common control channel.

4. The method of claim 1, wherein the first PUCCH is configured to transmit uplink control information (UCI), and a second PUCCH is configured to transmit UCI which is different from the UCI transmitted on the first PUCCH.

5. A communication method, comprising:

receiving, by a terminal, a first piece of information from a network device, wherein the first piece of information is used to configure the terminal to carry a first Physical Uplink Control Channel (PUCCH) in one or more first slots;

carrying, by the terminal, the first PUCCH in the one or more first slots according to the first piece of information, wherein the first piece of information carries an indication of a starting first slot of the one or more first slots, and a number of the one or more first slots; and determining, by the terminal, the one or more first slots according to the indication of the starting first slot and the number of the one or more first slots, wherein when not all the first slots after the starting first slot are used to carry the first PUCCH, the first slots configured for carrying the first PUCCH include multiple nonconsecutive slots.

6. The method of claim 5, the method further comprising:

determining, by the terminal, the uplink symbols, for transmitting the first PUCCH, in the first slot based on the structure of the first slot, wherein the structure of the first slot shows a number of uplink symbols and/or downlink symbols.

7. The method of claim 6, the method further comprising:

receiving, by the terminal, a second piece of information indicating the structure of the of the one or more first slots from the network device, wherein the second piece of information is carried in a common control channel.

8. The method of claim 5, wherein the first PUCCH is configured to transmit uplink control information (UCI), and a second PUCCH is configured to transmit UCI which is different from the UCI transmitted on the first PUCCH.

9. A network device, comprising:

a processor, configured to determine one or more first slots to be configured for a terminal to carry a first Physical Uplink Control Channel (PUCCH); and a communications interface, configured to send a first piece of information to the terminal, to configure the terminal to carry the first PUCCH in the one or more first slots, wherein the first piece of information carries an indication of a starting first slot of the one or more first slots, and a number of the one or more first slots, and when not all the first slots after the starting first slot are used to carry the first PUCCH, the first slots configured for carrying the first PUCCH include multiple nonconsecutive slots.

10. The network device of claim 9, wherein the processor is further configured to:

estimate a number of symbols to be configured for the terminal to carry the first PUCCH; and determine the one or more first slots according to the estimated number of symbols and the structure of slots capable of being used by the terminal, wherein the structure of the slots shows the number of uplink symbols and/or downlink symbols.

11. The network device of claim 9, wherein the communications interface is further configured to:

send a second piece of information indicating the structure of the one or more first slots via a common control channel.

12. The network device of claim 9, wherein the first PUCCH is configured to transmit uplink control information (UCI), and a second PUCCH is configured to transmit UCI which is different from the UCI transmitted on the first PUCCH.

13. A terminal, comprising:

a communications interface, configured to receive a first piece of information from a network device, the first piece of information is used to configure the terminal to carry a first Physical Uplink Control Channel (PUCCH) in one or more first slots; and a processor, configured to:

carry the first PUCCH in the one or more first slots according to the first piece of information, wherein the first piece of information carries an indication of a starting first slot of the one or more first slots, and a number of the one or more first slots, and determine the one or more first slots according to the indication of the starting first slot and the number of the one or more first slots, wherein when not all the first slots after the starting first slot are used to carry the first PUCCH, the first slots configured for carrying the first PUCCH include multiple nonconsecutive slots.

14. The terminal of claim 13, wherein the processor is further configured to:

determine the uplink symbols, for transmitting the first PUCCH, in the first slot based on the structure of the first slot, wherein the structure of the first slot shows a number of uplink symbols and/or downlink symbols.

15. The terminal of claim 14, wherein the communications interface is further configured to:

receive a second piece of information indicating the structure of the one or more first slots from the network device, wherein the second piece of information is carried in a common control channel.

16. The terminal of claim 13, wherein the first PUCCH is configured to transmit uplink control information (UCI), and a second PUCCH is configured to transmit UCI which is different from the UCI transmitted on the first PUCCH.

* * * * *